United States Patent
Talluri et al.

(10) Patent No.: US 10,446,340 B2
(45) Date of Patent: Oct. 15, 2019

(54) METHOD FOR CONTROLLED ENERGISING OF A TRANSFORMER

(71) Applicant: ABB Schweiz AG, Baden (CH)

(72) Inventors: Anil Talluri, Bangalore (IN); Anoop Parapurath, Bangalore (IN); Urmil Parikh, Vadodara (IN)

(73) Assignee: ABB Schweiz AG, Baden (CH)

( * ) Notice: Subject to any disclaimer, the term of this patent is extended or adjusted under 35 U.S.C. 154(b) by 350 days.

(21) Appl. No.: 15/539,649

(22) PCT Filed: Dec. 24, 2015

(86) PCT No.: PCT/IB2015/059974
§ 371 (c)(1),
(2) Date: Jun. 23, 2017

(87) PCT Pub. No.: WO2016/103228
PCT Pub. Date: Jun. 30, 2016

(65) Prior Publication Data
US 2018/0012711 A1   Jan. 11, 2018

(30) Foreign Application Priority Data
Dec. 24, 2014 (IN) .......................... 6547/CHE/2014

(51) Int. Cl.
*H01H 9/56* (2006.01)
*H02H 7/26* (2006.01)
(Continued)

(52) U.S. Cl.
CPC ............... *H01H 9/56* (2013.01); *H02H 7/04* (2013.01); *H02H 7/26* (2013.01); *H02H 9/002* (2013.01); *H02H 3/06* (2013.01)

(58) Field of Classification Search
CPC .. H01H 9/56; H02H 7/04; H02H 7/26; H02H 9/002; H02H 3/06
(Continued)

(56) References Cited

U.S. PATENT DOCUMENTS

| 5,479,086 A | 12/1995 | Konstanzer |
| 8,039,994 B2 * | 10/2011 | Divan ................ H02H 9/001 307/103 |

(Continued)

OTHER PUBLICATIONS

European Patent Office, International Search Report for PCT/IB2015/059974, dated Apr. 1, 2016, 5 pages.
(Continued)

*Primary Examiner* — Zeev V Kitov
(74) *Attorney, Agent, or Firm* — Barnes & Thornburg LLP

(57) ABSTRACT

In aspects, the present invention provides a method for controlled energizing of a transformer (150) being connected to a first electrical subsystem (110) through a first circuit breaker (140). The method comprises acquiring electrical current waveform in a first phase of the transformer during a closing operation of the first circuit breaker at an instance for switching determined by a controller (130), determining a first peak (310) in the current in the first phase within a first predetermined time window (Tpw), calculating a first correction factor for adjusting the instance for switching in the first phase, and adjusting the instance for switching based on the calculated first correction factor for performing a next controlled energization at the adjusted instance of switching in the first phase.

7 Claims, 3 Drawing Sheets

(51) Int. Cl.
*H02H 7/04* (2006.01)
*H02H 9/00* (2006.01)
*H02H 3/06* (2006.01)

(58) Field of Classification Search
USPC .......................................................... 361/211
See application file for complete search history.

(56) References Cited

U.S. PATENT DOCUMENTS

| | | | | |
|---|---|---|---|---|
| 8,422,179 B2* | 4/2013 | Zhan | ....................... | H02H 9/002 361/18 |
| 8,779,634 B2* | 7/2014 | Tsutada | ................ | H01H 33/593 307/127 |
| 2009/0134862 A1* | 5/2009 | Kinoshita | .............. | H02H 9/002 323/361 |
| 2015/0349511 A1* | 12/2015 | Kojovic | ................ | G01R 15/181 361/36 |

OTHER PUBLICATIONS

European Patent Office, Written Opinion of the International Searching Authority for PCT/IB2015/059974, dated Apr. 1, 2016, 6 pages.
European Patent Office, International Preliminary Report on Patentability for PCT/IB2015/059974, dated Jun. 27, 2017, 7 pages.
Chiesa N et al: "Novel Approach for Reducing Transformer Inrush Currents: Laboratory Measurements, Analytical Interpretation and Simulation Studies", IEEE Transactions on Power Delivery, IEEE Service Center, New York, NY, US, vol. 25, No. 4, Oct. 1, 2010 (Oct. 1, 2010), pp. 2609-2616, XP011317261, ISSN: 0885-8977.
Corrodi Y et al: "Influence of system transients on the residual flux of an unloaded transformer", Power and Energy Society General Meeting, 2011 IEEE, IEEE, Jul. 24, 2011 (Jul. 24, 2011), pp. 1-7, XP032055560, ISBN: 978-1-4577-1000-1, DOI: 10.1109/PES.2011.6039530.
Fard Ali Asghar F et al: "Reduction of three-phase transformer magnetizing inrush current by use of point on wave switching", Research and Development (Scored), 2009 IEEE Student Conference on, IEEE, Piscataway, NJ, USA, Nov. 16, 2009 (Nov. 16, 2009), pp. 368-370, XP031655615, ISBN: 978-1-4244-5186-9.

* cited by examiner

METHOD FOR CONTROLLED ENERGISING OF A TRANSFORMER

CROSS-REFERENCE TO RELATED APPLICATIONS

This application is a U.S. national stage of International Application Serial No. PCT/IB2015/059974, filed Dec. 24, 2015, which claims priority to Indian Patent Application No. 6547/CHE/2014, filed Dec. 24, 2014. The entire disclosures of both of the foregoing applications are hereby incorporated by reference.

FIELD OF THE INVENTION

The present invention relates to point on wave controllers. More particularly, the present invention relates to point on wave controllers employed for point on wave switching of transformers.

BACKGROUND

In power systems, circuit breakers are used for connecting and disconnecting a load. During this process, the active elements of the circuit breaker either interrupt or incept high current, causing stresses in the circuit breaker as well as the connected power system components. The flow of the high current can be limited by closing and opening the circuit breaker at a specific instance on the source voltage waveform. A plurality of techniques are known for controlling the opening or closing of the circuit breaker in order to prevent generation of transient phenomenon. Such techniques rely on the usage of devices that perform synchronized switching control. One such device is the point on wave controller.

Point on wave controller is used for controlling switching instance of the circuit breaker. On receiving a command from a control unit, the point on wave controller advances the command to achieve closing or opening at an instance to minimize the current. The point on wave controller detects the opening or closing actuation time (also referred to as operating time) of the circuit breaker and calculates a time for switching in respect of the opening or closing command of the circuit breaker to ensure switching on a particular point on the voltage waveform. The point on wave controller determines the opening or closing actuation time as the time period between the instance at which the command was given to the circuit breaker and the instance at which electrical switching (i.e. interruption or inception of the electrical connection) happened.

Conventionally, in order to mitigate inrush currents, transformers are deenergised or opened at peak on the voltage waveform and energized or closed at the peak having the same polarity as the previous opening, on the voltage waveform. However, due to improper deenegisation and due to magnetic hysteresis, flux is often retained or left in transformer core.

When the effect of residual fluxes are not considered while deciding optimum targets for controlled energization of transformers, the resultant fluxes would be unsymmetrical and hence, heavy magnetic inrush currents will experienced while closing.

Conventionally, magnetizing inrush currents due to asymmetric flux have been mitigated by determining the residual flux in each phase based on load side voltage. The residual fluxes are calculated upon integration of transformer side voltage and hence, requires transformer winding side voltage measurements. In the absence such measurements due to unavailability of voltage transformers on transformer side, the residual fluxes cannot be directly estimated and hence effective mitigation of magnetizing inrush current is not possible.

This is further exacerbated in cases where there is interphase coupling between the phases of the transformer. In such cases, magnetic fluxes, which is to be estimated in each phase, would be dependent on the residual flux remaining on that phase and the flux induced by an interconnected phase.

Therefore, in light of the abovementioned discussion, there is a need for a method and system that satisfies the above mentioned problems.

BRIEF DESCRIPTION OF THE INVENTION

The above-mentioned shortcomings, disadvantages and problems are addressed herein which will be understood by reading and understanding the following specification.

In one aspect, the present invention provides a method for controlled energizing in a multiphase electrical system having a transformer being connected to a first electrical subsystem through a first circuit breaker. The first circuit breaker is operated by a controller. The transformer comprises a first phase.

The method comprises acquiring electrical current waveform in the first phase of the transformer from a current measuring device during a closing operation of the first circuit breaker at an instance for switching determined by the controller, determining a first peak in the current in the first phase within a first predetermined window, calculating a first correction factor for adjusting the instance for switching in the first phase, based on the first peak and adjusting the instance for switching based on the calculated first correction factor for performing a next controlled energization at the adjusted instance of switching in the first phase. The first peak is instance at which the magnitude of the current in the first phase is maximum within the first predetermined window.

In an embodiment, the transformer includes a second phase. The method further comprises acquiring electrical current waveform in the second phase of the transformer from a current measuring device during the closing operation of the first circuit breaker; determining a second peak in the current in the second phase within a second predetermined window, wherein the second peak is instance at which the magnitude of the current in the second phase is maximum within the second predetermined window; calculating a second correction factor for adjusting the instance for switching in the second phase, based the first peak and the second peak, and adjusting the instance for switching in the second phase based on the calculated second correction factor for performing a next controlled energization at the adjusted instance of switching in the second phase.

In an embodiment, the method further comprises determining another peak in the current in the first phase within the first predetermined window, and determining a ratio of the first peak and the another peak for calculating the first correction factor. The ratio is indicative of a symmetry of the current waveform in the first phase during the closing operation.

In an embodiment calculating the first correction factor and the second correction factor comprises determining at least one pair of values indicative of apparent magnetic property of the transformer and an apparent residual flux in first phase of the transformer and determining at least one second pair of values indicative of the apparent magnetic property of the transformer and an apparent residual flux in the second phase of the transformer.

In an embodiment, the electrical system further comprises a second electrical subsystem being connected to the transformer through a second circuit breaker, the second circuit breaker operated by another controller.

In an embodiment the method further comprises transmitting the at least one pair of values and the at least one second pair of values from the controller to the another controller for adjusting another instance for switching determined by the controller for operating the second circuit breaker; calculating a third correction factor for adjusting the another instance for switching determined by the controller in the first phase of the second circuit breaker based on the at least one pair of values and the at least one second pair of values, and adjusting the another instance for switching based on one of the calculated third correction factor for performing a next controlled energization at the adjusted another instance of switching in the first phase.

In an embodiment, where the first phase of the transformer is inter-coupled to the second phase of the transformer, the method further comprising determining a flux distribution coefficient indicative of a proportion of flux of one of the first phase and second phase, flowing in one of the second phase and first phase respectively.

In another aspect the present invention discloses a controller configured to operate a circuit breaker in a multiphase electrical system having a subsystem connectable to a transformer. The controller comprises one or more processors configured to acquire electrical current waveform in at least one phase of the transformer from a current measuring device during the closing operation of the circuit breaker, determine one or more peaks in the current in the at least one phase within a predetermined window, calculate at least one correction factor for adjusting the instance for switching in the at least one phase, based the one or more peaks, and adjust the instance for switching in the at least one phase based on the calculated at least one correction factor for performing a next controlled energization at the adjusted instance of switching in the at least one phase. The controller also includes a memory module functionally coupled to the one or more processors.

Systems and methods of varying scope are described herein. In addition to the aspects and advantages described in this summary, further aspects and advantages will become apparent by reference to the drawings and with reference to the detailed description that follows.

DETAILED DESCRIPTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
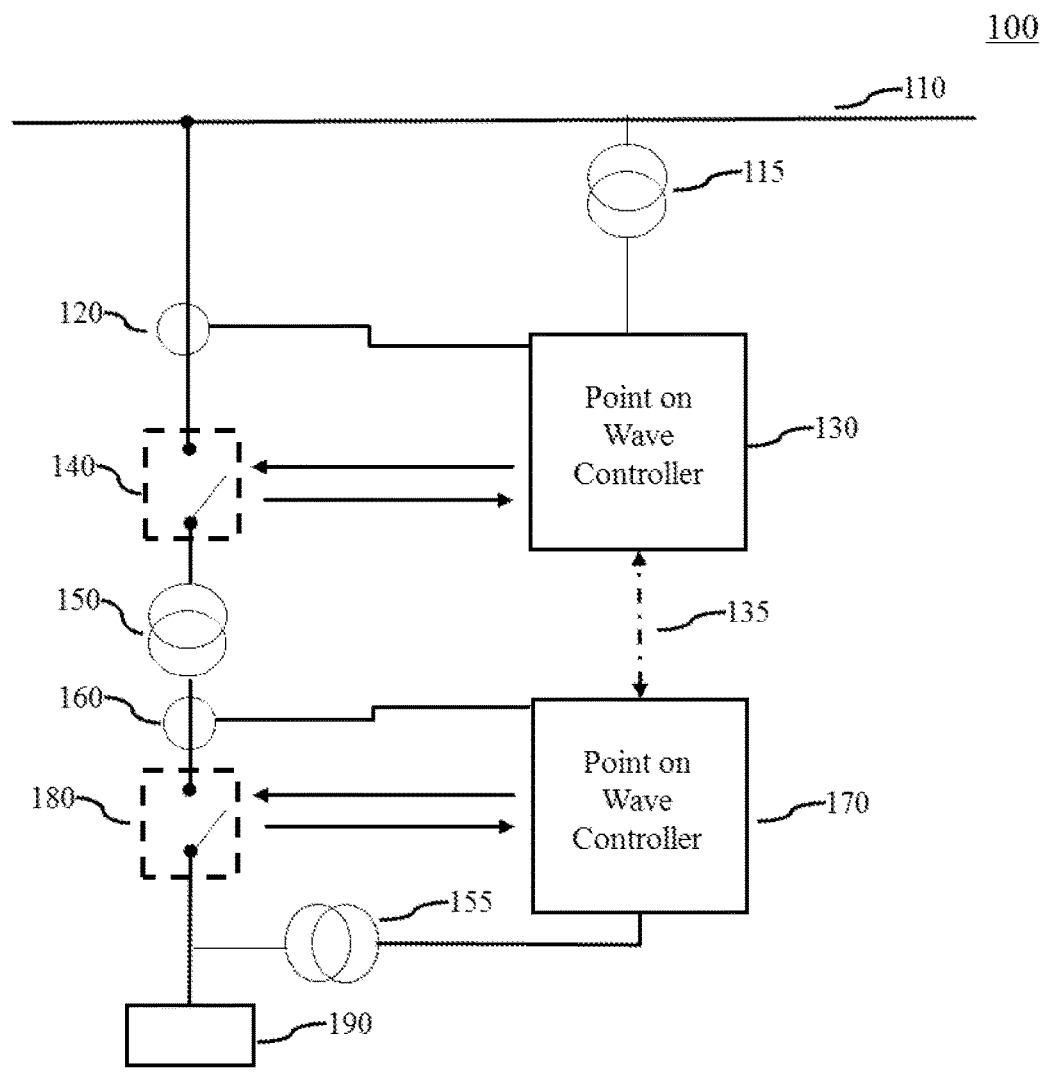
FIG. 1 illustrates a typical single line representation of a multiphase electrical system, in accordance with various embodiments of the present invention.

FIG. 1 illustrates a multiphase electrical system 100. The multiphase electrical system 100 includes a first subsystem 110 (represented in figure as a bus 110). The first subsystem 110 can be connected to a second subsystem 190 through a transformer 150. A first circuit breaker 140 is provided between the first subsystem 110 and the transformer 150 for protection and isolation. Similarly, a second circuit breaker 180 is provided between the transformer 150 and the second subsystem 190.

The first circuit breaker 140 can perform a closing operation to establish electrical connection between the first subsystem 110 and the transformer 150 in one or more phases and an opening operation to interrupt the electrical connection between the first subsystem 110 and the transformer 150 in the one or more phases. The closing operation and opening operation are generally referred to as switching. Similarly, the second circuit breaker 180 can perform a closing operation to establish electrical connection between the transformer 150 in one or more phases and the second subsystem 190, and an opening operation to interrupt the electrical connection between the transformer 150 and the second subsystem 190 in the one or more phases. The closing operation and opening operation are performed for energizing and deenergising the transformer 150 and performed in a controlled fashion. These controlled switching operations are distinguished from uncontrolled switching (i.e. uncontrolled closing and uncontrolled opening operations) which may be performed for deenergising the subsystem 190 and the transformer 150.

In an embodiment, at least one phase of the transformer 150 is intercoupled with another phase of the transformer 150. For example, the transformer 150 is a three limb three phase transformer with inter phase coupling between the phases L1, L2 and L3. In the example, when L1 phase of the transformer 150 is connected to the power source 110, due to the inter phase coupling, voltage is induced in the L2 and L3 phases of the transformer 150. Similarly, upon energization of the L1 phase, flux of the L1 phase distributes itself between L2 and L3 phases.

Opening and closing of the circuit breakers 140 and 180 are controlled by a point on wave controller 130 and a point on wave controller 170 respectively. The point wave controller 130 is also referred to as an intelligent electronic device 130 or controller 130. The point wave controller 170 is also referred to as an intelligent electronic device 170 or controller 170. The point on wave controllers are used to determine appropriate switching instances for operating the corresponding circuit breaker to ensure minimal electrical disturbance in the electrical system 100, and to ensure that electrical and mechanical shock generated while switching are minimal. The point on wave controllers are configured to receive information relating to current in the transformer 150 from a current measuring means such as a current transformer 120 or current transformer 160. Similarly, the point on wave controllers are configured to receive information related to voltage of the first subsystem 110 from a voltage measuring means (such as a voltage transformer 115) and information related to voltage of the second subsystem 190 from a voltage measuring means (such as a voltage transformer 155). The controller 130 and the controller 170 are interconnected with each other through a communication channel 135.

The point on wave controller 130 includes one or more processors for computation, estimation and correction of a instance for switching (also known as time for switching or switching angle) in at least one phase, a memory module functionally coupled to the one or more processors for storing information required for estimation and correction of the instance for switching, and a network interface capable of communicating over a communication channel. The one or more processors of the point on wave controller 130 are configured to acquire electrical current waveform in at least one phase of the transformer 150 from the current transformer 120 during a closing operation of the first circuit breaker 140 at the estimated instance for switching in the at least one phase, determine a first peak in the current in the at least one phase within a predetermined window, wherein the first peak is an instance at which the magnitude of the current in the at least one phase is maximum within the first predetermined window, calculate at least one correction factor for adjusting the instance for switching in the at least one phase based on the first peak, and adjust the estimated instance for switching based on the first correction factor for performing a next controlled energization at the adjusted instance of switching in the at least one phase. These aspects are further explained in reference to FIG. 2.

It is to be noted by a person skilled in the art that the second subsystem 190 mentioned herein can include electrical elements and devices such as transmission lines, power transformers, capacitor banks, shunt reactors, motor loads, etc., which are capable of drawing power from the first subsystem 110. Additionally, it is to be noted by a person skilled in the art that the transformer 150 can include one or more phases ad one or more windings corresponding to the plurality of phases.

Additionally, it is to be noted that communication of voltage and current measurement from the voltage transformer 115, voltage transformer 155, the current transformer 120 and the current transformer 160 to the point on wave controller 130 and point on wave controller 170 can be performed in a plurality of ways using networks and corresponding network configurations known to the person skilled in art. Similarly, it is to be noted by a person skilled in the art that while FIG. 1 discloses the first circuit breaker 140 and the second circuit breaker 180, similar switching devices can also be used in place of the circuit breaker 140 and 180. Additionally, while two circuit breakers (140 and 180) are shown in the figure, one or more circuit breakers can be used in their place for performing the same functionality of connecting and disconnecting the one or more winding of the transformer 150 to one or more subsystems. Additionally, it is to be noted by a person skilled in the art that while two independent controllers (130 and 170) have been used for controlling the operation of the circuit breakers (140 and 180), various other control philosophies known could be used for controlling the circuit breakers (140 and 180). For example, control of both the circuit breakers could be performed using a single controller or using a master-slave controller configuration. It is to be noted by a person skilled in the art that coupling herein refers to any one of electrical, magnetic, electrostatic, and electrodynamic coupling and the like.

Figure 2:
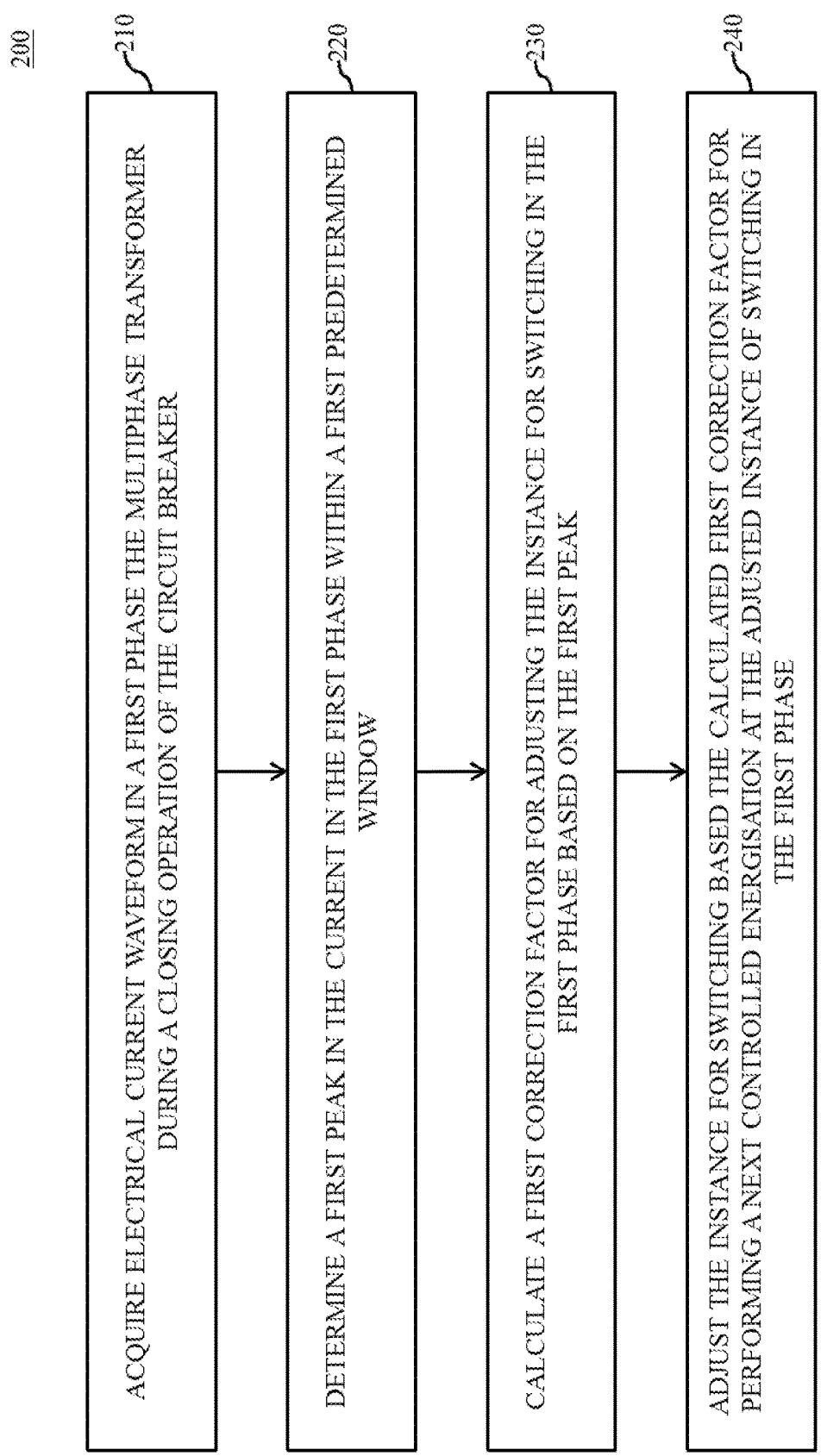
FIG. 2 is a flowchart of a method for controlled energizing of a transformer, in accordance with various embodiments of the present invention.

FIG. 2 illustrates of a method 200 for controlled energizing of the transformer 150 through the first circuit breaker (140).

At step 210, the controller 130 acquires electrical current waveform in a first phase of the transformer 150 from the current transformer 120 during a closing operation of the first circuit breaker 140 at an instance for switching in the first phase determined by the controller 130. The instance of switching in the first phase is determined by the controller 130 using techniques conventionally known in point on wave philosophy. The controller 130 monitors the current in the first phase during the closing operation through the current transformer 120. The current transformer 120 continuously measures the current in the first phase and sends sampled values of the current in the first phase to the controller 130.

Prior to the above mentioned closing operation being performed, a controlled opening operation of the first circuit breaker 140 was performed by the controller 130. Due to a magnetic property of the transformer 150, certain amount of the magnetic flux remains in the transformer 150 after the controlled opening (this flux being referred to as residual magnetic flux). The amount of magnetic flux remnant in the transformer 150 is dependent on the point on the voltage waveform at which the controlled opening was performed. The controlled opening operation is performed in accordance with techniques known in the state of the art, to leave a fixed amount of residual flux (i.e. fixed residual flux) in the transformer 150. The controlled opening operation is always performed on the same point on the voltage waveform to ensure that the same amount of fixed residual flux is left in the transformer 150.

The term magnetic property as mentioned herein refers to a magnetic characteristic of the transformer design aspects such as geometry of core, amount of air gap in the magnetic circuit, operating temperature of the core, level of lamination and the material used in the transformer 150. The magnetic property is indicative of the capability of the transformer 150 to form and/or retain magnetic flux and magnetic circuits within itself. The magnetic property can include and is not limited to permeability, hysteresis, and the like. In an embodiment, the magnetic property is the permanence of the transformer 150.

The instance of switching in the first phase as determined by the controller 130 for performing the closing operation is calculated on the voltage of the first subsystem 110 measured by the voltage transformer 115 to ensure that the flux during the closing operation is equivalent to the fixed residual flux left in the transformer 150 after the controlled opening operation. However, since the amount of residual flux is not known, the instance of switching is determined by the controller 130, assuming the residual flux and magnetic property as zero. In other words, the controller 130 neglects the magnetic property and residual flux during determination of the instance of switching in the first phase.

At step 220, based on the sampled values of the current during the closing operation, the controller 130 determines a first peak in the current in the first phase within a first predetermined window. The first peak is a peak in the current waveform at which the magnitude of the current in the first phase is maximum within the first predetermined window. The first peak can be a positive peak or a negative peak. Magnitude herein refers to the absolute value of the current, independent of the polarity. The first predetermined window is calculated by adding a multiple of the time period of the half cycle of the current to the instance of time at which the command for closing was given to the first circuit breaker 140 in the first phase.

In a first embodiment, the controller 130 determines another peak in the current in the first phase within the first predetermined window. Another peak is a peak immediately preceding the first peak in the current waveform. If the there are no peaks preceding the first peak, then the another peak is a peak immediately succeeding the first peak in the current waveform.

In a second embodiment, the transformer 150 includes the first phase and a second phase. In the second embodiment, the controller 130 acquires electrical current waveform in the second phase of the multiphase transformer 150 from the current transformer 120 during the closing operation of the first circuit breaker 140. Based on the monitored current in the second phase, the controller 130 determines a second peak in the current in the second phase within a second predetermined window. Similar to the first peak, the second peak is instance at which the magnitude of the current in the second phase is maximum within the second predetermined window. The second predetermined window is calculated by adding a multiple of the time period of the half cycle of the current to the instance of time at which the command for closing was given to the first circuit breaker 140 in the second phase.

At step 230, the controller 130 calculates a first correction factor for adjusting the instance for switching in the first phase, based on the first peak.

Continuing the above mentioned first embodiment, the controller 130 determines a ratio of the first peak and the another peak in the current of the first phase, for calculating the first correction factor. The numerator of the ratio is the value (i.e. magnitude) of the peak which is earlier in time when compared with the other peak. The denominator of the ratio is the value of the peak which is later in time. For example, when the another peak precedes the first peak, the numerator is the magnitude of the another peak and the denominator is the magnitude of the first peak. The ratio is indicative of a symmetry of the current waveform in the first phase during the closing operation. Based on the degree of symmetry or asymmetry as reflected by the ratio, the instance of switching in the first phase is either advanced or delayed by a percentage of a predetermined operating constant. When the ratio is greater than a predetermined value (for example 1) then the instance of switching is delayed by a fraction of the predetermined operating constant. Else, where the ratio is less than 1, the instance of switching is advanced by a fraction of the predetermined operating constant. This is further explained using the current waveform as illustrated in FIG. 3.

Figure 3:
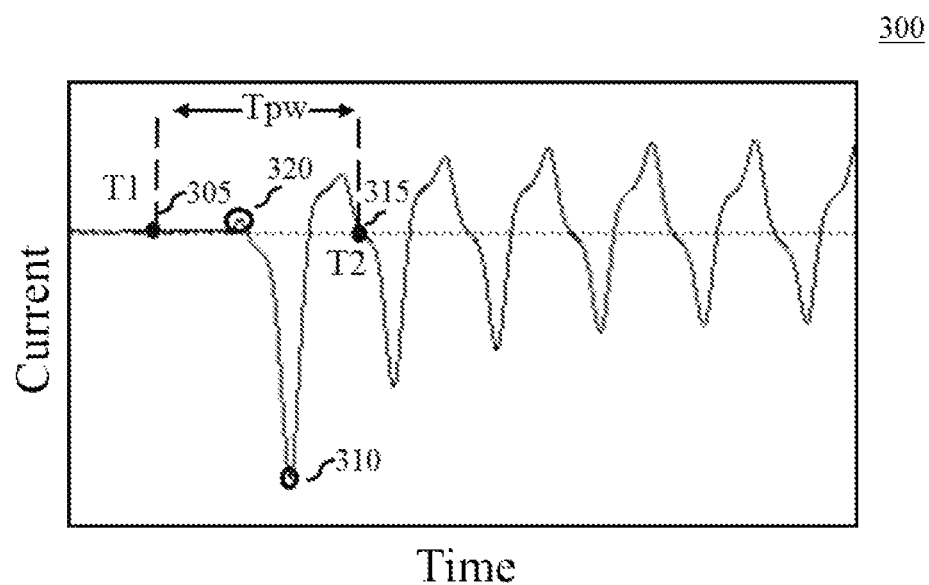
FIG. 3 illustrates a current waveform in a first phase of the transformer during a closing operation, in accordance with various embodiments of the present invention.

FIG. 3 illustrates current waveform in the first phase of the transformer 150 during the closing operation. The command for the closing the first circuit breaker 140 was given at instance T1 (shown in the figure using dot 305). An end instance of the first predetermined window (shown in the figure as $T_{pw}$) is calculated by adding time period of one cycle and a predetermined threshold value to the instance T1. The end instance is shown in the figure as T2 (dot 315). The first peak in the current waveform within T1 and T2 is indicated as hollow circle 310 and the another peak in the current waveform (i.e. the peak preceding the first peak 310) within T1 and T2 is indicated as hollow circle 320. For example, the magnitude of the current at the first peak is 161 Amperes and the magnitude of current at the another peak is 13 Amperes. Accordingly the ratio will be calculated as 13/161. Since the ratio is less than 1, the instance of switching is advanced.

Continuing the second embodiment, where the transformer 150 includes the first phase and the second phase, the controller 130 calculates the first correction factor based on the first peak in the current in the first phase and the second peak in the current in the second phase. Based on the first peak and the second peak, the controller 130 determines a pair of values indicative of apparent magnetic property of the multiphase transformer 150 and apparent residual flux in the first phase of the multiphase transformer 150. The current (i.e. the magnetizing inrush current) during closing operation is dependent on the flux in the transformer 150 during the closing operation and can be described as below:

$$Im_x(t)=f(\varnothing_x(t),£) \qquad \text{Eqn (1)}$$

Where,
$Im_x$ (t) denotes the magnetic inrush current flowing through winding 'x' at instant 't' in the first phase of the transformer 150'
$\varnothing_x$(t) denotes the magnetic flux in the core of the first phase of the transformer 150 at instant 't'
£ denotes the magnetic property of the transformer 150
Additionally, the magnetic flux in the first phase of the transformer 150 can be described as $$\varnothing_x(t)=\varnothing_{rx}(t)+\varnothing_{sx}(t,\theta x) \qquad \text{Eqn (2)}$$

Where,
$\varnothing_{rx}$(t) denotes instantaneous residual flux in the core of the first phase at time 't' (accounting for the possible decay of residual flux),
$\varnothing_{sx}$(t, θx) denotes the prospective flux of the first phase at time 't' because of the voltage of the subsystem 110
θx denotes the phase angle at which switching or closing is carried out in the first phase.
This is equivalent to the instance of switching in the first phase.

Based on the above mentioned relationship, it can be observed that there is a direct relation between the magnetic inrush current experienced in the first phase during the closing operation, magnetic property of the transformer 150 and magnetic flux including the residual flux, in the first phase of the transformer 150. In other words, in addition to being dependent on voltage of the subsystem 110, the magnetic inrush current experienced by the transformer during closing in the first phase, is dependent on and is indicative of the magnetic property of the transformer 150 and the residual flux remaining in the first phase.

Similarly, an equivalent relationship exists between the magnetic inrush current experienced in the second phase during the closing operation, the magnetic property of the transformer 150 and the magnetic flux including the residual flux in the second phase of the transformer 150.

Based on the above mentioned relationship, in an exemplary configuration of the transformer 150, the peak value of the magnetic inrush current can be formulated in terms of magnetic flux in the first phase and magnetic property as provided below:

$$|Im_x|=MAX(|K^*\sin h(£^*\varnothing_x(t))|) \qquad \text{Eqn (3)}$$

Where,
K is a constant that is equal for all phases in the multiphase system.

Accordingly, the controller 130 utilizes known iterative approximation methods for finding out a pair of values indicative of apparent magnetic property and apparent residual flux in the first phase and a second pair of values indicative of apparent magnetic property and apparent residual flux whose calculated peak current values ($Im_x$ as mentioned above) in the first phase matches the value of the first peak in the first phase and the calculated current value in the second phase matches the value of the second peak in the second phase. The apparent magnetic property being same in the one pair of values and in the second pair of values. Similarly, a value of the constant K is derived during the approximation mentioned previously. This can be described as shown below:

$$Find[£,Ø_{rFirst\ phase}(t)),(£,Ø_{rSecond\ phase}(t)),K]$$

Such that $$MAX(|K*Sin\ h(£*Ø_{First\ phase}(t))|)=|current\ magnitude\ at\ the\ first\ peak\ in\ the\ first\ phase|$$

Polarity of $Im_x$=Polarity of current at the first peak in the first phase and $$MAX(|K(*Sin\ h(£*Ø_{Second\ phase}(t))|)=|current\ magnitude\ at\ the\ second\ peak\ in\ the\ second\ phase|$$

Polarity of $Im_y$=Polarity of current at the second peak in the second phase

Where, $$Ø_{First\ phase}(t)=Ø_{rFirst\ phase}(t)+Ø_{sFirst\ phase}(t,\theta x)$$

$$Ø_{Second\ phase}(t)=Ø_{rSecond\ phase}(t)+Ø_{sSecond\ phase}(t,\theta y)$$

θx denotes the phase angle at which switching or closing is carried out in the first phase (equivalent to the instance of switching in the first phase.)

θy denotes the phase angle at which switching or closing is carried out in the second phase (equivalent to the instance of switching in the second phase.)

$Im_x$ denotes the calculated peak value of magnetic inrush current flowing in the first phase of the transformer 150

$Im_y$ denotes the calculated peak value of magnetic inrush current flowing in the second phase of the transformer 150

It is to be noted by the person skilled in the art, the term apparent magnetic property and apparent residual flux is used in relation to the roots or solutions determined by the controller to match the value of the first peak and second peak. This is particularly so, as the values determined are not derived based on the actual properties of the transformer construction and thus are not the actual magnetic property or the residual flux in the transformer 150.

Based on the pair of values indicative of the apparent magnetic property and the apparent residual flux in the first phase, the controller 130 determines an second instance of switching at which the peak value of the current during closing operation (also referred magnetic inrush current) in the first phase and second phase is minimized. Accordingly, the controller 130 calculates the first correction factor as a difference between the instance of switching in the first phase and the second instance of switching. In an embodiment, the controller 130 calculates a second correction factor as a difference between the second instance of switching and the instance of switching in the second phase.

At step 240, the controller 130 adjusts the instance for switching in the first phase based on the calculated first correction factor for performing a next controlled energization at the adjusted instance of switching in the first phase. In an embodiment, the instance of switching is adjusted using a percentage of the first correction factor. For example, the calculated first correction factor indicates that the instance of switching in the first phase needs to be advanced by 4.5 ms to match the second instance of switching. Accordingly, the instance of switching in the first phase is advanced by half of the first correction factor i.e. by 2.25 ms.

Similarly, in an embodiment, the controller 130 adjusts the instance for switching in the second phase based on the calculated second correction factor for performing a next controlled energization at the adjusted instance of switching in the second phase.

Subsequent to adjustment of the instance of switching in the first phase, when a command for disconnecting the transformer 150 from the first subsystem 110 is given to the controller 130, the controller 130 performs a subsequent controlled opening operation to disconnect the transformer 150 from the first subsystem 110. As mentioned previously, the controlled opening operation is performed at the same point on the voltage waveform as the initial controlled opening to ensure that the fixed amount of residual flux is left in the transformer 150.

Accordingly, when a command for connection of the transformer 150 to the first subsystem 110 is given to the controller 130, the controller 130 operates the first circuit breaker 140 at the adjusted instance of switching in the first phase for connecting the transformer 150 to the first subsystem 110 in the first phase. Similarly, the controller 130 operates the first circuit breaker 140 at the adjusted instance of switching in the second phase for connecting the transformer 150 to the first subsystem 110 in the second phase.

It is to be noted by a person skilled in the art, that the term first phase as mentioned herein refers to any one phase of the system 100 and is not restricted to the first phase to open or the first phase to close. Similarly, the term second phase as mentioned herein refers to any another phase of the system 100 and is not restricted to the second phase to open or the second phase to close. It is to be noted by a person skilled in the art that while the current method 200 has been explained for connection of the transformer 150 with the first subsystem 110 using the first circuit breaker 140 and the controller 130, the method can be applied for energization of the transformer 150 via the second subsystem 190 using the second circuit breaker 180 and the controller 170. Additionally, it is to be noted by a person skilled in the art that the term peak as mentioned herein refers to a point on the current waveform where the gradient of the current is zero. The peak can be a crest or trough or a saddle point in the current waveform.

In an embodiment, the controller 130 transmits the one pair of values and the second pair of values from the controller 130 to the controller 170 via the communication channel 135, for adjusting another instance for switching determined by the controller 170 for operating the second circuit breaker 180 for switching in the first phase. The controller 170 is configured to utilize the one pair of values and the second pair of values for calculating a third correction factor for adjusting the another instance for switching determined by the controller 170 in the first phase of the second circuit breaker 180 using the method as explained above. Accordingly, the controller 170 adjusts the another instance for switching based on the calculated third correction factor for performing a next controlled energization at the adjusted another instance of switching in the first phase.

It is to be noted by a person skilled in the art, the controller 130 and 170 are configured to communicate with each other the calculated pairs of values of apparent magnetic property and residual flux in either of the phases (first phase and second phase) via the communication channel 135, to adjust the instance of switching in the corresponding phase while operating the corresponding circuit breaker (140, 180). In an embodiment, the controller 130 and 170 are configured to utilize the pair of values and the second pair of values from a controller (130 or 170) whose circuit breaker (140 or 180) was opened most recently to deenergise the transformer 150 in a controlled fashion. If the calculated pairs of values are not available at the controller (130 or 170) which is going to perform controlled closing, the controller utilizes the calculated pairs from the other controller (170 or 130) if available.

In an embodiment as described previously, the first phase and the second phase of the transformer 150 are intercoupled with each other. Due to the coupling of the phases, the flux in the phases changes upon the energization of either one of the phases. In an example, the first phase is energized prior to the second phase. The magnetic flux in case of the second phase is described as below:

$$\varnothing_y(t) = \varnothing_{ry}(t) + \varnothing_{sy}(t, \theta y) + \varnothing_{dy}(t, \theta x) \quad \text{Eqn (4)}$$

$$\varnothing_{dy}(t, \theta x) = C_{xy} * \varnothing_{sx}(t, \theta x) \quad \text{Eqn (5)}$$

Where,
- '$\varnothing_{ry}(t)$' denotes instantaneous residual flux in the core of the second phase at time 't',
- '$\varnothing_{sy}(t, \theta y)$' denotes the prospective flux of the second phase at time 't' because of the voltage of the first subsystem 110
- $\varnothing_{dy}(t, \theta x)$ denotes the dynamic flux flowing in the second phase due to the energization of the first phase.
- $C_{xy}$ denotes the flux distribution coefficient which indicates proportion of the flux in the first phase flowing in the second phase upon energization of the first phase
- $\theta x$ denotes the phase angle at which switching or closing is carried out in the first phase (which switched prior to the second phase. This is equivalent to the instance of switching in the first phase.)
- $\theta y$ denotes the phase angle at which switching or closing is carried out in the second phase (This is equivalent to the instance of switching in the second phase.)

Accordingly, the controller 130 utilizes known iterative approximation methods for finding out a pair of values indicative of apparent magnetic property and apparent residual flux in the first phase and a second pair of values indicative of apparent magnetic property and apparent residual flux whose calculated peak current values (Im$_x$ as mentioned above) in the first phase matches the value of the first peak in the first phase and the calculated current value in the second phase matches the value of the second peak in the second phase. Similarly, a value of the constant K and $C_{xy}$ is derived during the approximation mentioned previously. This can be described as shown below:

$$\text{Find}[(£, \varnothing_{rFirst\ phase}(t)), (£, \varnothing_{rSecond\ phase}(t)), K, C_{xy}]$$

Such that $$\text{MAX}(|K * \sin h(£ * \varnothing_{First\ phase}(t))|) = |\text{current magnitude at the first peak in the first phase}|$$

Polarity of $Im_x$ = Polarity of current at the first peak in the first phase and $$\text{MAX}(|K * \sin h(£ * \varnothing_{Second\ phase}(t))|) = |\text{current magnitude at the second peak in the second phase}|$$

Polarity of $Im_y$ = Polarity of current at the second peak in the second phase

Where, $$\varnothing_{First\ phase}(t) = \varnothing_{rFirst\ phase}(t) + \varnothing_{sFirst\ phase}(t, \theta x)$$

$$\varnothing_{Second\ phase}(t) = \varnothing_{rSecond\ phase}(t) + \varnothing_{sSecond\ phase}(t, \theta y) + C_{xy} + \varnothing_{sFirst\ phase}(t, \theta x)$$

Accordingly, the controller 130 is configured to determine the flux distribution coefficient $C_{xy}$ as mentioned above. Additionally, in an embodiment, along with the second pair of values indicative of the apparent magnetic property and the apparent residual flux in the second phase, the controller 130 utilizes the flux distribution coefficient $C_{xy}$ while determining an second instance of switching at which the peak value of the current during closing operation (also referred magnetic inrush current) in the first phase and second phase is minimized.

Additionally in an embodiment, the controller 130 transmits the flux distribution coefficient $C_{xy}$ along with the second pair of values to the controller 170 for adjusting the another instance of switching associated with the second circuit breaker 180 in the second phase.

It is to be noted by a person skilled in the art that while the effect of dynamic flux is illustrated using the first phase and second phase, the dynamic flux on the second phase can be due to a plurality of phases which coupled to the second phase and are energized prior to the second phase.

In an embodiment, the controller 130 does not adjust the instance of switching in the first phase when the magnitude of the first peak is below a predetermined inrush current value. In such a situation, no correction is performed.

In an embodiment, the controller 130 is configured to reset the one pair of values and the second pair of values to predetermined values, upon modification of at least one of the magnetic property and residual flux of the transformer 150. For example, when the transformer 150 is taken offline for maintenance, the magnetic property of the transformer 150 can change based on the nature of repair or maintenance being carried out on the transformer 150. In another example, when the transformer 150 is deenergised by a protection operation (i.e. uncontrolled opening operation), the residual flux in the transformer 150 is changed and cannot be estimated using inrush current waveform observed during a previous closing operation. Accordingly, in such situations, the controller 130 resets the one pair of values and the second pair of values to zero. In an embodiment, the predetermined values are zero. In other words, the controller 130 neglects the magnetic property and residual flux during determination of the instance of switching in the first phase.

The current invention provides a method for regulation of inrush current by modifying the instance of switching based on the waveform of inrush current experienced during a previous controlled closing operation. By doing so, the current invention eliminates the need for voltage measurement equipment at the transformer side. Additionally, the current invention relies solely on the inrush current waveform for correcting the instance of switching and hence modeling of the transformer is not required. By doing away with the need for modeling, extensive testing of transformer for determination of the intrinsic properties of the transformer needed for modelling, is not required.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlled energizing in a multiphase electrical system having a transformer being connected to a first electrical subsystem through a first circuit breaker, the first circuit breaker operated by a first controller, wherein the transformer comprises a first phase, the method comprising:
   acquiring an electrical current waveform in the first phase of the transformer from a current measuring device during a closing operation of the first circuit breaker at an instance for switching determined by the first controller;
   determining a first peak in the current in the first phase within a first predetermined window, wherein the first peak is an instance at which the magnitude of the current in the first phase is maximum within the first predetermined window;
   calculating a first correction factor for adjusting the instance for switching in the first phase based on the first peak, wherein calculating the first correction factor comprises determining another peak in the current in the first phase within the first predetermined window and determining a ratio of the first peak and the another peak for calculating the first correction factor, wherein the ratio is indicative of a symmetry of the current waveform in the first phase during the closing operation; and
   adjusting the instance for switching based on the calculated first correction factor for performing a next controlled energization at the adjusted instance of switching in the first phase.

2. The method as claimed in 1, wherein the transformer includes a second phase, the method further comprising:
   acquiring an electrical current waveform in the second phase of the transformer from a current measuring device during the closing operation of the first circuit breaker;
   determining a second peak in the current in the second phase within a second predetermined window, wherein the second peak is an instance at which the magnitude of the current in the second phase is maximum within the second predetermined window;
   calculating a second correction factor for adjusting the instance for switching in the second phase based the first peak and the second peak, and
   adjusting the instance for switching in the second phase based on the calculated second correction factor for performing a next controlled energization at the adjusted instance of switching in the second phase.

3. The method as claimed in claim 2, wherein calculating the first correction factor and the second correction factor comprises
   determining at least one pair of values indicative of an apparent magnetic property of the transformer and an apparent residual flux in first phase of the transformer; and
   determining at least one second pair of values indicative of the apparent magnetic property of the transformer and an apparent residual flux in the second phase of the transformer.

4. The method as claimed in claim 3, wherein the electrical system further comprises a second electrical subsystem being connected to the transformer through a second circuit breaker, the second circuit breaker operated by a second controller, the method further comprising
   transmitting the at least one pair of values and the at least one second pair of values from the first controller to the second controller for adjusting another instance for switching determined by the second controller for operating the second circuit breaker;
   calculating a third correction factor for adjusting the another instance for switching determined by the second controller in the first phase of the second circuit breaker based on the at least one pair of values and the at least one second pair of values, and
   adjusting the another instance for switching based on one of the calculated third correction factor for performing a next controlled energization at the adjusted another instance of switching in the first phase.

5. The method as claimed in claim 3, further comprising resetting the at least one pair of values and the at least one second pair of values to predetermined values.

6. The method as claimed in claim 4, wherein the first phase of the transformer is inter-coupled to the second phase of the transformer, the method further comprising determining a flux distribution coefficient indicative of a proportion of flux of one of the first phase and second phase, flowing in one of the second phase and first phase respectively.

7. A controller configured to operate a circuit breaker in a multiphase electrical system having a subsystem connectable to a transformer, the controller comprising:
   one or more processors configured to (i) acquire an electrical current waveform in at least one phase of the transformer from a current measuring device during the closing operation of the circuit breaker; (ii) determine one or more peaks in the current in the at least one phase within a predetermined window; (iii) calculate at least one correction factor for adjusting an instance for switching in the at least one phase based the one or more peaks, wherein calculating the at least one correction factor comprises determining another peak in the current in the at least one phase within the predetermined window and determining a ratio of the one or more peaks and the another peak for calculating the first correction factor, wherein the ratio is indicative of a symmetry of the current waveform in the at least one phase during the closing operation and (iv) adjust the instance for switching in the at least one phase based on the calculated at least one correction factor for performing a next controlled energization at the adjusted instance of switching in the at least one phase, and
   a memory module functionally coupled to the one or more processors.

* * * * *